United States Patent [19]

Kamata

[11] 4,150,260
[45] Apr. 17, 1979

[54] SUBSCRIBER'S CIRCUIT FOR FOUR-WIRE-SYSTEM LOCAL SWITCH

[75] Inventor: Kozo Kamata, Yokohama, Japan

[73] Assignee: Hitachi, Ltd., Japan

[21] Appl. No.: 695,760

[22] Filed: Jun. 14, 1976

[30] Foreign Application Priority Data

| Jun. 18, 1975 | [JP] | Japan | 50-73212 |
| Jun. 20, 1975 | [JP] | Japan | 50-74535 |
| Jun. 24, 1975 | [JP] | Japan | 50-76550 |
| Aug. 1, 1975 | [JP] | Japan | 50-93101 |
| Aug. 15, 1975 | [JP] | Japan | 50-98580 |
| Sep. 5, 1975 | [JP] | Japan | 50-106991 |

[51] Int. Cl.² ........................... H04M 1/00
[52] U.S. Cl. ................. 179/81 R; 179/170 D
[58] Field of Search ............ 179/81 R, 81 A, 170 R, 179/170 D, 170 NC, 170 T, 170.2, 170.8, 84 R, 18 HB; 333/11

[56] References Cited

U.S. PATENT DOCUMENTS

| 3,189,693 | 6/1965 | Fudaley | 179/170 NC |
| 3,479,617 | 11/1969 | Rhyne | 179/170 D |
| 3,480,742 | 11/1969 | Gaunt | 179/170 NC |
| 3,517,133 | 6/1970 | Knight | 179/84 R |
| 3,517,137 | 6/1970 | Ribner | 179/81 R |
| 3,908,094 | 9/1975 | Deluegue | 179/81 A |

Primary Examiner—William C. Cooper
Assistant Examiner—Joseph A. Popek
Attorney, Agent, or Firm—Craig & Antonelli

[57] ABSTRACT

A subscriber's circuit for a four-wire-system local switch is provided with a two-wire/four-wire hybrid circuit that includes a two-wire/four-wire converter circuit. Connected between the converter circuit and a time-division switch section is an incoming circuit that amplifies an incoming voice current, supplies a DC current to a subscriber's telephone set, and generates a subscriber's line signal of large amplitude, such as a bell and a howler signal, by repeatedly reversing the polarity of the DC current. An alarm signal is produced by stepwise changing the duration and the frequency of the repetitive polarity reversal in response to digital command signals supplied from the time-division switch section. An outgoing circuit device, which is connected between the converter circuit and the time-division switch section amplifies the output signal of the converter circuit, transmits a signal representative of a subscriber's call or answer to the time-division switch section in response to the state of the DC current supplied to the subscriber's telephone set, and terminates the operation thereof in response to the cut-off of the DC current to thereby prevent singing.

7 Claims, 11 Drawing Figures

SUBSCRIBER'S CIRCUIT FOR FOUR-WIRE-SYSTEM LOCAL SWITCH

The present invention relates to a subscriber's circuit suitable for a four-wire-system local switch and more particularly to a subscriber's circuit for supplying a DC current to a telephone set, transmitting a bell and a howler signal, detecting a call and an answer and preventing singing.

The conventional local switches are generally limited to a two-wire system. This is due to the fact that the two-wire system of the subscriber's line makes difficult a low-transmission-loss operation of the four-wire switch and that, even if the four-wire switch is possible in such a case, the exchange will be uneconomically high in cost. In the case where a time-division digital switching system is applied to a local switch, however, it is well known that a four-wire switch requires circuit arrangement that the receiving and the transmitting section thereof be separated.

The above and other objects, features and advantages will be made apparent by the detailed description taken in conjunction with the accompanying drawings, in which.

Figure 1:
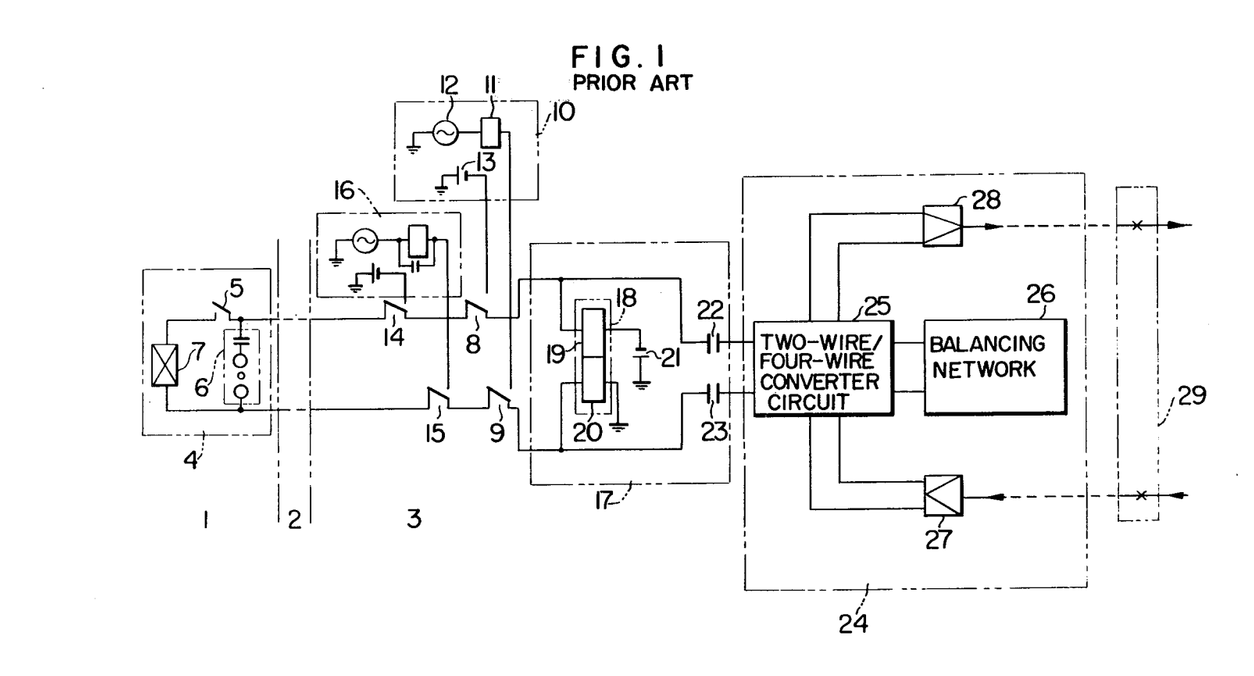
FIG. 1 is a block diagram for explaining the operation of a conventional subscriber's circuit system.

Assuming that the subscriber's circuit used for the conventional two-wire switch is used, as it is, for a subscriber's circuit of four-wire switch such as a time division digital switch, the resulting circuit arrangement is as shown in FIG. 1.

In FIG. 1, reference numeral 1 designates a subscriber's premise, numeral 2 a subscriber's line, and numeral 3 a telephone exchange office. Numeral 4 designates a telephone set, numeral 5 a hook switch, numeral 6 a bell, numeral 7 a handset, numerals 8, 9, 14 and 15 relay contacts of the telephone exchange office, numeral 10 a bell signal circuit, numeral 11 an answer-detecting relay, numeral 12 a 16Hz power supply, numeral 13 a power supply, numeral 16 a howler signal circuit, numeral 17 a DC power supply circuit, numeral 18 a balanced type double-coil relay with coils 19 and 20, numeral 21 an intra-office power supply, 22 and 23 capacitors for cutting off a direct current, numeral 24 a hybrid circuit, numeral 25 a two-wire/four-wire converter circuit, numeral 26 a balancing network, numeral 27 a receiving amplifier circuit, numeral 28 an amplifier circuit, and numeral 29 a time-division switch section.

In this circuit arrangement, when the subscriber picks up the handset 7 for making a call, a signal is sent out to the subscriber's line 2 from the intra-office power supply 21 through the relay coil 19 and relay contacts 8 and 14, so that a DC current is supplied to the handset 7 as it flows back to the exchange 3 via the hook switch 5 and handset 7 of the telephone set 4, the subscriber's line 2, the relay contacts 15 and 9, and the relay coil 20. At the same time, the balanced type double-coil relay 18 is energized. In response to the energization of the balanced type double-coil relay 18, the telephone exchange office 3 makes preparations for connection at its contacts not shown, followed by receiving the other party's number transmitted from the telephone set 4, thereby starting the switching operation for connecting the calling party to the other party. Upon completing the connecting operation, the voice speech current from the telephone set 4 actuated by the DC current supplied from the exchange office 3 reaches the telephone exchange office 3 through the subscriber's line 2. After passing the relay contacts 14, 15, 8 and 9, the DC component of this current is separated by the capacitors 22 and 23 and introduced into the hybrid circuit 24. In the hybrid circuit 24, the transmitting section thereof is separated from the receiving section thereof by the two-wire/four-wire converter circuit 25, and the output current of amplifier circuit 28 reaches the called party not shown through a coding circuit and a highway circuit not shown after given the exchange operation performed in the time-division switch section 29.

Now, the receiving operation will be explained below.

When a signal terminates at the subscriber's premise 1, a relay not shown in the drawing is energized by the telephone exchange office 3, so that the bell signal circuit 10 is connected by the contacts 8 and 9 of the relay. A bell signal is transmitted from the 16Hz power supply 12 within the bell signal circuit 10 and, through the subscriber's line 2, reaches the telephone set 4 thereby to ring the bell 6 thereof. When the subscriber picks up the handset 7 and answers, the hook switch 5 is closed and DC current is sent out from the intra-office power supply 13 in the bell signal circuit 10, which current flows back through the answer-detecting relay 11. The fact that the call has been answered is detected by the telephone exchange office 3 thereby to proceed with the connecting operation. Upon completing the connecting operation, the speech current from the other party is introduced into the receiving amplifier circuit 27 via the time-division switch section 29 and a highway circuit and a decoding circuit not shown. In the receiving amplifier circuit 27, the voice level is regulated. The output of the receiving amplifier circuit 27 is converted into a two-wire system in the two-wire/four-wire converter circuit 25, while a balance with the subscriber's line 2 is established in the balancing network 26, with the result that the output of the converter circuit 25 is applied to the telephone set 4 through the capacitors 22 and 23, the relays 8, 9, 14 and 15 and further through the subscriber's line 2.

By the way, the howler signal circuit is provided for the purpose of issuing an audible alarm in the case where the subscriber fails to hang up the handset 4. The alarming sound is gradually increased in level. If the subscriber still fails to hang up the handset even after the alarm is given for a certain period of time, the line is forcibly cut off. The circuit arrangement of this circuit is similar to that of the bell signal circuit 10 and therefore will not be described.

This conventional subscriber's circuit system has the following shortcomings:

(1) A countermeasure is required to be taken against the insertion loss due to the DC current power supply circuit 17.

(2) The bell signal and the howler signal require an output of large amplitude and cannot pass the time-division switch. It is therefore necessary to provide a contactor circuit corresponding to the subscriber for connecting the subscriber's line to the signal source side.

(3) The presence of a group of contactor circuits at the two-wire side of the hybrid circuit worsens the echo loss at the time of energization of the contactor circuits.

(4) The presence of inductive and capacitive impedances at the two-wire side of the hybrid circuit complicates the construction of the balancing network for assuring a balance with the hybrid circuit.

(5) As far as the subscriber's line is connected to the bell signal circuit and the howler signal circuit side, a degree of unbalance of the subscriber's line with respect to the earth is generally worsened.

(6) Since the bell signal and the howler signal are analog signals, neither the bell signal circuit nor the howler signal circuit nor the contactor circuit for circuit change-over can be produced in the form of economical integrated circuitry.

(7) The subscriber's circuit is provided for every subscriber separately and, therefore, requires an economical form suitable for miniaturization and integrated circuitry. However, the conventional type of circuit is not suitable for miniaturization and integrated circuitry.

(8) Since electromagnetic parts are involved, a high transient voltage is generated at the time of their energization, thus causing breakdown of the parts as well as generation of noise.

The present invention is intended to provide a subscriber's circuit adaptable to the four-wire switching and characterized in that:

(1) The point at which a DC current is supplied to the telephone set is moved to a hybrid circuit, and the voice output is superimposed on the DC current.

(2) A bell signal and a howler signal are generated by repeatedly reversing the polarity of the DC current sent out.

(3) By operating the hybrid circuit only when the DC current is supplied, the singing which might occur at the time of hooking or immediately after hooking on the handset is prevented.

With the features (1) to (3) described above as an essence, there is provided means for improving the transmission characteristics, especially, for preventing the singing, thereby realizing a four-wire switch with a low-transmission loss. Also, a signal system suitable for a logic circuit is employed and electromagnetic parts are eliminated. In this way, generation of a high voltage due to a transient phenomenon is prevented while at the same time making a compact and economical system possible.

Figure 2:
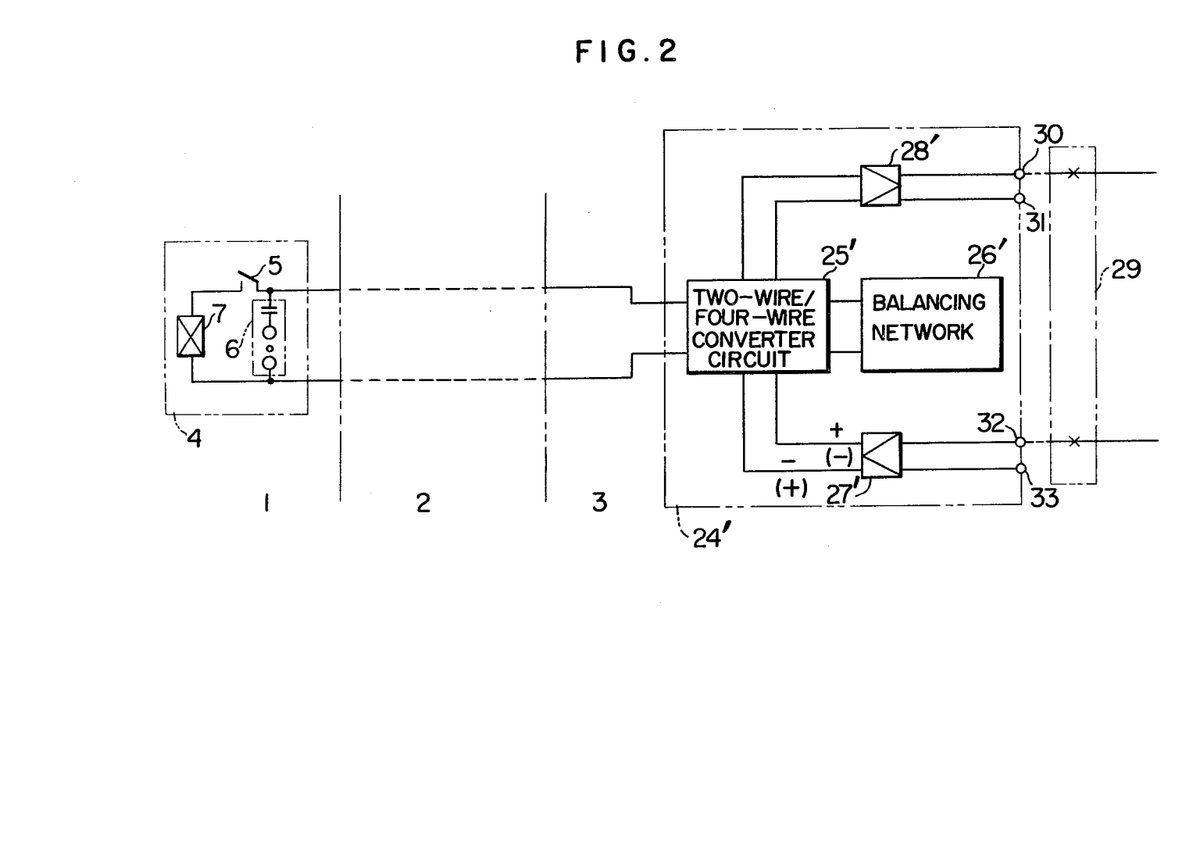
FIG. 2 is a block diagram showing a subscriber's circuit system according to the present invention.

In FIG. 2, like component elements are denoted by like reference numerals in FIG. 1. Referring to FIG. 2, reference numeral 24' designates a hybrid circuit, numeral 25' a two-wire/four wire converter circuit capable of transmitting a DC signal, and numeral 27' an incoming circuit device capable of supplying a DC current to the telephone set 4 and amplifying a voice current superimposed on the DC current and repeatedly reversing the polarity thereof. Numeral 32 designates a voice input terminal of the incoming circuit device 27', numeral 33 a polarity-reversing command input terminal of the incoming circuit device 27', and numeral 28' an outgoing circuit device, the output terminals which are composed of a voice output terminal 30, and a call-answer detecting terminal 31 for detecting the condition of the DC current on the subscriber's line which implys the call, answer, receiving of dial pulses and the like.

In FIG. 2, when calling the subscriber's premise 1 from the telephone exchange office 3, a 32Hz polarity-reversing command pulse signal is applied to the polarity-reversing command terminal 33 of the incoming circuit device 27' thereby to generate a bell signal. This bell signal is applied to the telephone set 4 via the two-wire/four-wire converter circuit 25' and the subscriber's line 2, thus ringing the bell 6. The subscriber's picking up the handset 7 causes the hook switch 5 to be closed, thus supplying a direct current to the handset 7. The direct current supplied to the handset 7 is detected by the outgoing circuit device 28', so that an output is produced at the call-answer detecting terminal 31 to indicate an answer. The telephone exchange office 3 stops sending the bell signal and proceeds with the connecting operation. Upon completion of the connecting operation, speech begins, so that the speech current from the other party is applied to the voice input terminal 32 via the time-division switch section 29, a highway circuit and a decoding circuit not shown. This signal is superimposed on the DC current supplied from the incoming circuit device 27' to the telephone set 4. Further, this speech current reaches the telephone set 4 through the two-wire/four-wire converter circuit 25' and the subscriber's line 2. The speech current from the telephone set 4, on the other hand, is introduced into the outgoing circuit device 28' via the subscriber's line 2 and the two-wire/four-wire converter circuit 25', thereby to produce an output at the voice output terminal of the outgoing circuit device 28'. The speech current further reaches the other party via the coding circuit, the highway circuit not shown and the time-division switch section 29.

Next, the calling operation of the subscriber will be explained below.

When the subscriber picks up the handset 7 for making a call, the hook switch 5 is closed, so that a DC current is supplied from the incoming circuit device 27' to the telephone 4 through the two-wire/four-wire converter circuit 25' and the subscriber's line 2. Simultaneously with the supply of DC current to the telephone 4, the outgoing circuit device 28' is energized and produces at its call-answer detecting terminal 31 an output indicating the requirement for a call. As a result, the telephone exchange office 3 proceeds with the preparations for connection, followed by receiving the telephone number of the other party transmitted from the subscriber and the operation of connecting the calling party to the other party. Upon completing the connecting operation, the voice speech current from the telephone 4 driven by the DC current supplied from the telephone exchange office 3 is separated into the voice speech currents fed to the transmission system and the receiving system in the two-wire/four-wire converter circuit 25' through the subscriber's line 2. Through the not-shown coding circuit and the highway circuit connected to the output terminal of the outgoing circuit device 28', the time-division exchange operation is performed in the time-division switch section 29, and the resulting signal reaches the other party not shown.

The systems which form the essential parts of the present invention will be specifically explained below.

(1) A system for DC current supply to the telephone set:

A system for supplying a DC current at the two-wire side of the hybrid circuit is accompanied by an insertion loss on the one hand and requires a circuit for separating the voice speech current from the DC current. Further, the circuits inserted at the two-wire side complicate the construction of the balancing network.

Figure 3:
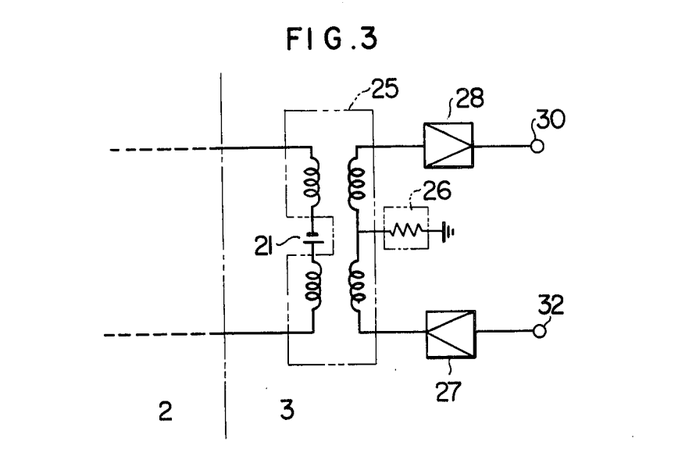
FIG. 3 is a diagram for explaining the basic principle of the DC current supply.
Figure 4:
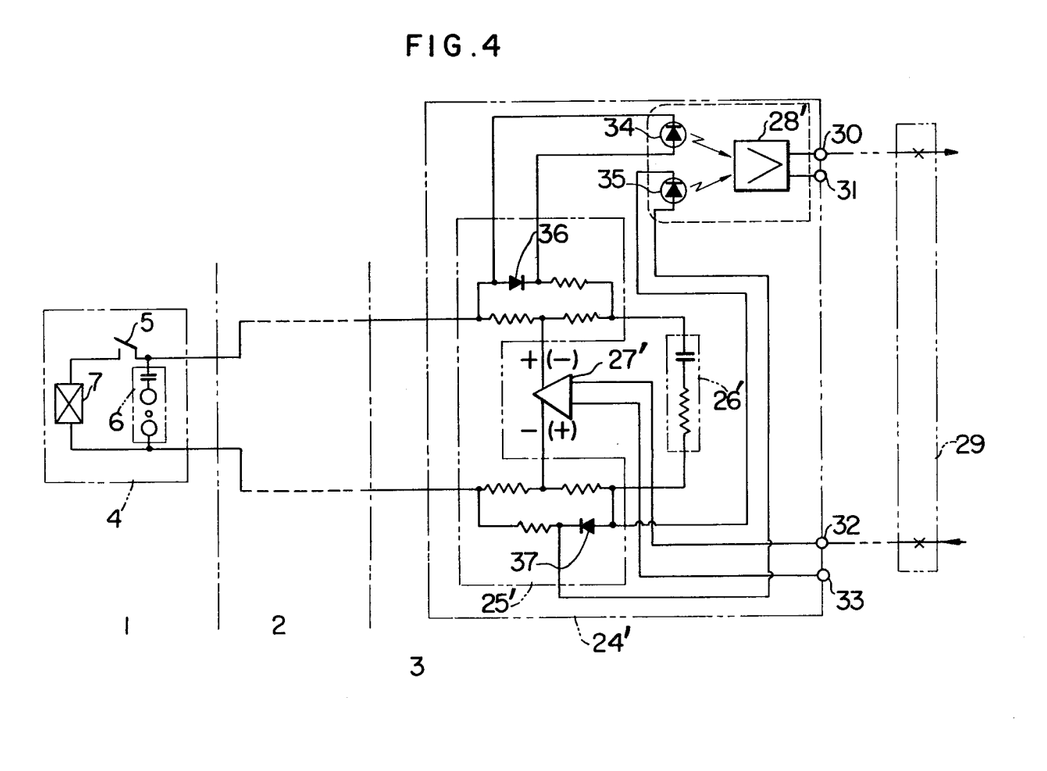
FIGS. 4 and 5 are diagrams showing examples of DC current supply according to the invention.
Figure 5:
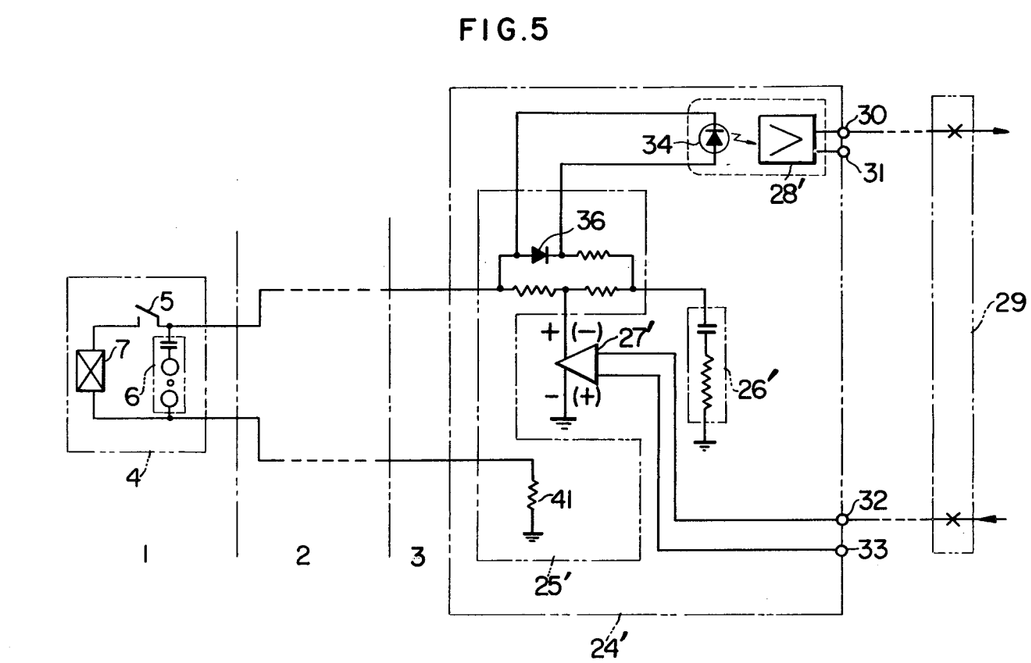
Figure 6:
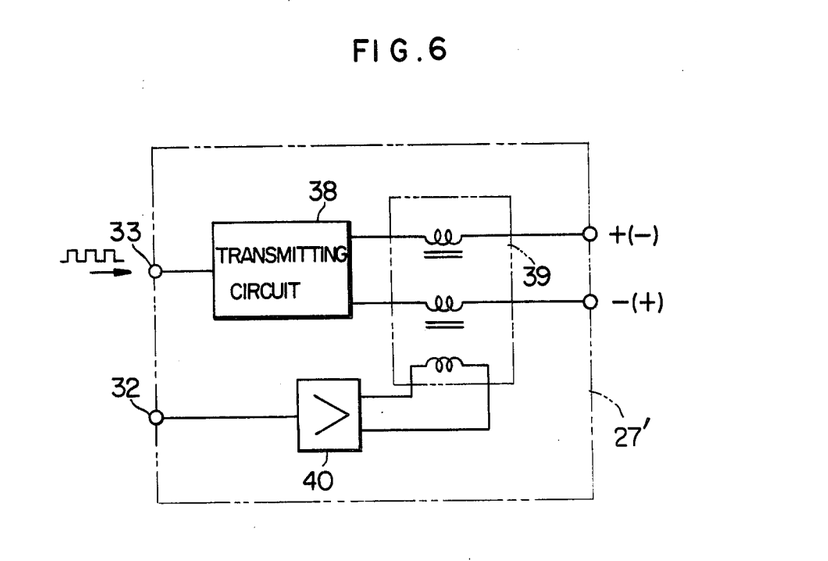
FIG. 6 is a diagram showing a basic circuit configuration of a receiving amplifier capable of transmitting a voice output superimposed on the DC current.

According to the present invention, the hybrid circuit has a function to supply a DC current, and the basic construction as shown in FIG. 3 is made possible if coils are used as the two-wire/four-wire converter circuit 25. In FIG. 3, like component parts are shown by like reference numerals in FIG. 1. The size of this basic construction, however, is not reduced in the case where a DC current is superimposed on the hybrid coils. Further, the disadvantage still remains unsolved that the transformers and the like form a roadblock to integration of the circuit. FIGS. 4 and 5 shows a resistor hybrid circuit capable of transmitting the direct current through the two-wire/four-wire converter circuit in order to eliminate the above-mentioned disadvantages. Specifically, FIG. 4 shows a circuit of balanced type, and FIG. 5 a circuit of unbalanced type. In FIGS. 4 and 5, like component elements are designated by like reference numerals in FIGS. 1 and 2. Referring to FIG. 4, reference numeral 27' designates an incoming circuit device capable of sending out a DC current. By applying a polarity-reversing command to the polarity-reversing command terminal 33, the polarity of DC output is reversed. The functions of this incoming circuit device 27' may be obtained, in principle, by combining the well-known bipolar-pulse transmitting circuit 38 for use in telegraph with the voice amplifier 40 and the transformer 39 for coupling the voice signal to the circuit 38, shown in FIG. 6. Actually, however, the combination of these functions is designed in the form of a circuit which does not employ any parts such as a transformer.

In FIG. 4, the two-wire/four-wire converter circuit 25' is of bridged H-type.

At the bridge section, the voice and the DC signal are taken out by the diodes 34 and 35 of two photo-couplers thereby to photo-coupled them to the outgoing circuit device 28'. Such DC signals as a call and an answer are produced at the call-answer detecting terminal 31, while the voice output is produced at the voice output terminal 30. By the way, the two photo-couplers are coupled to the outgoing circuit device 28' in such a manner that the outputs therefrom make up a sum thereby to erase the longitudinal current from the subscriber's line 2. Also, the difference between the outputs is taken as required, thereby making possible the detection of a line trouble, if any, such as an induction failure or single-line grounding. The diodes 36 and 37 connected in parallel to the diode sections 34 and 35 of the photo-couplers are provided for purposes of protecting the photo-couplers and forming a bypass in the case of the polarity reversal of the DC current transmitted. The balancing network 26' is for maintaining balance with the subscriber's line against the voice output of the incoming circuit device 27'.

The circuit of FIG. 5 is intended to save circuit elements by forming the circuit of FIG. 4 as an unbalanced type and will not be described as it has the same operating principle as the circuit of FIG. 4. Incidentally, a resistor 41 is employed at the junction point of the subscriber's line thereby to regulate the balanced form.

(2) System for generating and transmitting a bell signal and howler signal:

According to the present invention, a subscriber's signal is generated by reversing the polarity of the DC current supplied to the telephone. Since conventional time-division switches could not pass the large power, the subscriber's line was connected to the signal source in order to transmit a bell and a howler signal to the subscriber. This system has the disadvantage that a plurality of contacts 8, 9, 14 and 15 are required for transmitting the bell signal and howler signal shown in FIG. 1 as corresponding to the subscriber, resulting in an increased amount of wiring and a decreased echo loss at the time of connecting to contacts 8, 9 or 14, 15.

The present invention overcomes these disadvantages. According to the invention, a subscriber's signal is generated by reversing the polarity of the DC current supplied to the telephone, and a large power is easily generated. And since the generation of the signal represents the operation of polarity reversal, the present invention may be suitable for a logic circuit, thus facilitating control.

Figure 7:
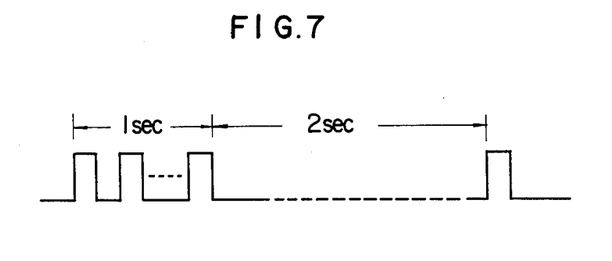
FIG. 7 shows an example of transmission command pulses for the bell signal.
Figure 8:
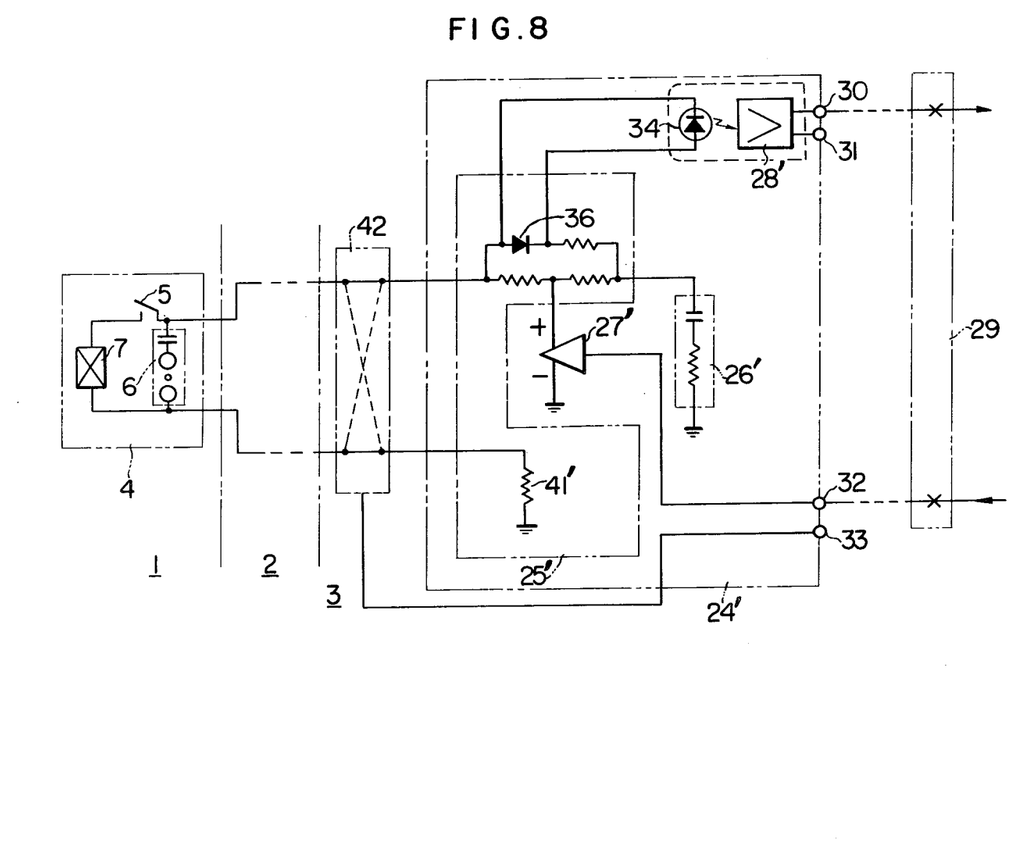
FIG. 8 is a diagram showing an embodiment of the method of signal generation in which the function of repeatedly reversing the DC current transmission polarity is separated from the receiving amplifier.

In FIG. 4 or 5, pulses of, say 32Hz as shown in FIG. 7 are transmitted for one second and suspended for two seconds at the polarity-reversing command terminal 33 of the incoming circuit device 27' so as to repeatedly reverse the transmission polarity of the local power supply −48V. In this way, a bell signal is generated and transmitted to the subscriber's line. Incidentally, the circuit of FIG. 8 shows an embodiment in which the function of polarity reversal is separated from the incoming circuit device 27' and an analog switch 42 added to generate a subscriber's line signal by applying and a repetitive reversal command thereto. As described above, according to the invention, a subscriber's signal is generated by the operation of polarity reversal of the DC power supply. If this operation is applied to the conventional system for transmitting a howler alarm, the circuit configuration is complicated since, in the conventional system, the signal is transmitted at a small amplitude at the initial stage of alarming while increasing it progressively. The present invention, on the other hand, employs a method suitable for a logic circuit, whereby an alarming period is progressively lengthened.

Figure 9:
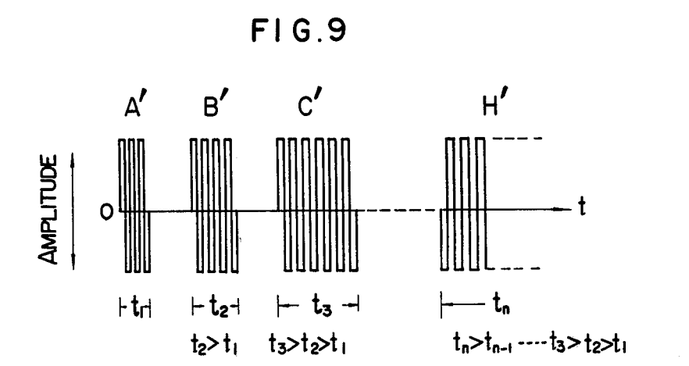
FIGS. 9 and 10 are diagrams for explaining the howler alarm transmission system.
Figure 10:
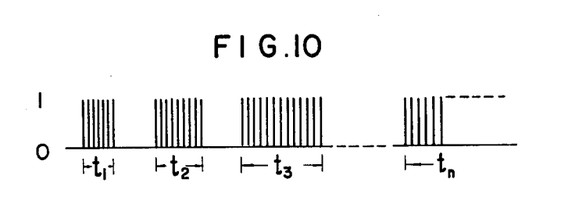

The diagram of FIGS. 9 and 10 are for explaining the method for transmitting a howler alarm signal according to the present invention. Specifically, a waveform of the howler alarm signal transmitted to the subscriber's line is shown in FIG. 9, while FIG. 10 shows a command for repetitive polarity-reversing for transmitting a howler alarm signal, which is applied to the polarity-reversing command terminal 33 of FIG. 4. By the way, in the event that no answer is obtained from the subscriber after issue of an alarm signal for a certain period of time, the action is taken to disconnect the subscriber's telephone set in the same manner as in the conventional system.

(3) Subscriber's line signal-detecting system:

In the conventional subscriber's circuit shown in FIG. 1, the detection of a subscriber's call or "on-hook" is effected by the balanced type double-coil relay 18 while the detection of a subscriber's answer is performed by the answer-detecting relay 11 of the bell signal circuit 10. Both of the signal detection are based on the monitoring of the outflow of DC current from the power supply. This function is utilized by the present invention, so that by providing a two-wire/four-wire converter circuit in the form capable of transmitting a DC signal, a subscriber's signal is monitored and detected by a unified means represented by the outgoing circuit device 28' shown in FIG. 4, thus simplifying the circuit construction. Referring to FIGS. 4 and 5, the DC current state of the subscriber's line is displayed at the call-answer detecting terminal 31 of the outgoing circuit device 28'. By so doing, the detection of a call, on-hook and answer as well as the transmission and receipt of dial pulses are carried out in the telephone exchange office 3.

(4) Singing-dampening system:

In effecting the exchange operation on the two-wire channel with a four-wire exchange switch, it is generally considered that the generation of singing makes difficult an exchange operation with low transmission loss. According to the present invention, the operation of the outgoing circuit device is turned on and off depending on whether or not the DC current is supplied to the subscriber's telephone. Therefore, the singing at the time of hooking or immediately after hooking on is dampened, thus permitting an exchange operation with low transmission loss.

Embodiments of the present invention are shown in FIGS. 4 and 5. In FIG. 4, only when a DC forward current is flowing in the diode sections 34 and 35 of the photo-couplers, the two-wire/four-wire converter circuit are photo-coupled to the outgoing circuit device 28'. At the same time when the subscriber hooks on, the DC current supply is cut off to terminate the photo-coupling. As a result, the singing loop comprising the incoming circuit device 27', the two-wire/four-wire converter circuit 25' and the outgoing circuit device 28' is also cut off. Since the embodiment of FIG. 5 operates in the similar way to that of FIG. 4, it will not be described.

It will be understood from the foregoing description that the system according to the present invention eliminates the disadvantages of the prior art on the one hand and uses no electromagnetic parts at all on the other. Thus, the size of the system can be reduced and also it can be formed in integrated circuitry. Further, the absence of electromagnetic parts prevents a high voltage from being generated, with the result that not only the breakdown of the parts is prevented but also local noises are reduced. Although the embodiments of FIGS. 4 and 5 are described above employing the photo-couplers as elements for coupling the two-wire/four-wire converter circuit 25' and the outgoing circuit device 28' together, they may be replaced by any elements such as operational amplifiers or Hall elements capable of detecting the state of DC current supply.

Figure 11:
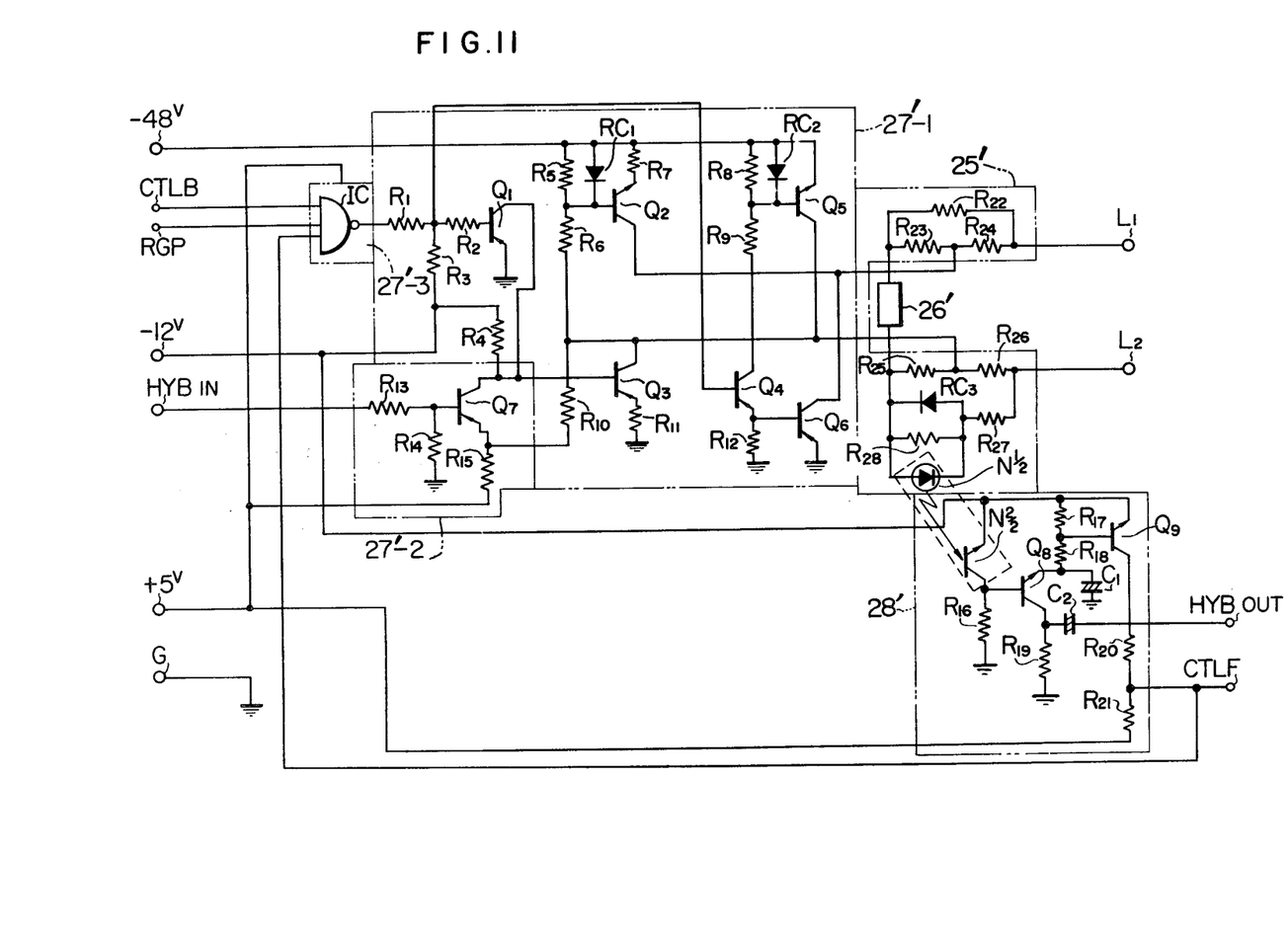
FIG. 11 is a circuit diagram of a specific subscriber's circuit system according to the invention.

A more specific practical subscriber's circuit system according to the present invention is shown in FIG. 11. In this drawing, reference numeral 25' designates a two-wire/four-wire converter circuit, numeral 26' a balancing network, numeral 27'-1 a polarity-reversing section of the incoming circuit device, numeral 27'-2 a voice-coupling section thereof, numeral 27'-3 a bell signal control section thereof, and numeral 28' an outgoing circuit device. Reference characters $R_1$ to $R_{28}$ designate resistors, characters $C_1$ to $C_2$ capacitors, characters $RC_1$ to $RC_3$ circuit-protecting diodes, characters $Q_1$ to $Q_9$ transistors, character IC a three-input NAND gate, character N a photo-coupler, numerals $-48V$, $-12V$ and $+5V$ DC power supply terminals, character G an earth terminal, characters $L_1$ and $L_2$ connecting terminals for subscriber's line, character RGP a 16Hz bell signal input terminal, character CTLB a bell signal transmission control terminal, character CTLF a call-answer detecting terminal, character HYBIN a voice input terminal, and character HYBOUT a voice output terminal.

The operation from the transmission of a bell signal to the answer by the subscriber will be explained below with reference to FIG. 11. The terminal RGP is kept impressed with a 16Hz logic level with the duty ratio of 50% at regular intervals including 1-second transmission and 2-second suspension. The terminal CTLB is impressed with a "0" level signal when no bell signal is transmitted. Now, assume that the level of the terminal CTLB is changed to "1". Since a "1" signal is applied to the remaining input terminal of the three-input AND gate IC from the outgoing circuit device 28' during the on-hook state of the subscriber, the output of the three-input AND gate IC alternates between "1" and "0" in accordance with the input at the terminal RGP. As a result, the polarity-reversing section 27'-1 of the incoming circuit device alternates between the state that the transistors $Q_2$ and $Q_3$ are ON, while transistors $Q_5$ and $Q_6$ are OFF, and the state that the transistors $Q_2$ and $Q_3$ are OFF while the transistors $Q_5$ and $Q_6$ are ON. In this way, the DC current flows into the subscriber's line through the two-wire/four-wire converter circuit. When the subscriber answers by hooking off the handset in response to the bell signal generated by this repetitive polarity reversal of the DC power supply, DC current is supplied from the power supply of $-48V$ to the handset. This is detected by the photo-coupler N, so that the transistor $Q_7$ in the outgoing circuit device is turned ON, thus changing the logic level of the terminal CTLF from "1" to "0". As the result of the output of the terminal CTLF having changed to "0", the telephone exchange office proceeds with the connecting operation. Further, the output at the terminal CTLF branches into the bell signal transmission control section 27'-3 thereby to stop the transmission of a bell signal. Upon completion of the connecting operation by the telephone exchange office, the speech current from the other party is supplied to the terminal HYBIN and coupled to the polarity-reversing section 27'-1 via the voice-coupling section 27'-2. Further through the two-wire/four-wire converter circuit 25', it is sent out to the subscriber's line by way of the terminals $L_1$ and $L_2$. Also, the speech current that arrives at the terminals $L_1$ and $L_2$ via the subscriber's line is coupled to the outgoing circuit device 28' by the diode section N1/2 of the photo-coupler of the two-wire/four-wire converter circuit 25'. The output of the outgoing circuit device 28' is applied to the other party through the terminal HYBOUT, thus permitting the subscriber to talk with the other party. Under this condition, assume that the subscriber has made hooking on the handset. The DC current supply to the subscriber's telephone is stopped while eliminating the forward bias current which has been flowing through the diode section N1/2 of the photo-coupler. The coupling to the outgoing circuit device 28' is also cut off. Therefore, the echo current that has been flowing from the terminal HYBIN to the terminal HYBOUT disappears.

In the practical circuit under consideration, a photo-coupler is inserted only in one side of the two-wire/four-wire converter circuit of H-shaped bridge type. In the event that a long subscriber's line is involved or the system is located in an environment easily subjected to external induction, however, another photo-coupler may be inserted on the other side of the bridge, so that a sum of the two outputs is taken, thus erasing the longitudinal current. Furthermore, this practical circuit employs a constant-current supply system for supplying a DC current to the subscriber.

What is claimed is:

1. A subscriber's circuit for a four-wire-system local switch having a two-wire/four-wire hybrid circuit comprising:
   (a) a two-wire/four-wire converter for connecting a two-wire system with a four-wire system;
   (b) an incoming circuit device, connected between said converter and a time-division switch section, for amplifying an incoming voice current from said switch section and for supplying a DC current to a subscriber's telephone set through said converter; and
   (c) an outgoing circuit device, connected between said converter and said switch section, for amplifying an outgoing voice current from said subscriber's telephone set,
   said incoming circuit device comprising means for generating a subscriber's line signal of predetermined frequencies by repeatedly reversing the polarity of said DC current in response to a command signal supplied from said switch section.

2. A subscriber's circuit for a four-wire-system local switch having a two-wire/four-wire hybrid circuit comprising:
   (a) a two-wire/four-wire converter for connecting a two-wire system with a four-wire system;
   (b) an incoming circuit device, connected between said converter and a time-division switch section, for amplifying an incoming voice current from said switch section and for supplying a DC current to a subscriber's telephone set through said converter; and
   (c) an outgoing circuit device, connected between said converter and said switch section, for amplifying an outgoing voice current from said subscriber's telephone set,
   said incoming circuit device comprising means for generating a howler alarm signal by repeatedly reversing the polarity of said DC current and stepwise changing the duration and/or the frequency of the repetitive polarity reversal in response to a command signal supplied from said switch section.

3. A subscriber's circuit for a four-wire-system local switch having a two-wire/four-wire hybrid circuit comprising:
   (a) a two-wire/four-wire converter for connecting a two-wire system with a four-wire system;
   (b) an incoming circuit device, connected between said converter and a time-division switch section, for amplifying an incoming voice current from said switch section and for supplying a DC current to a subscriber's telephone set through said converter; and
   (c) an outgoing circuit device, connected between said converter and said switch section, for amplifying an outgoing voice current from said subscriber's telephone set,
   said two-wire/four-wire converter being a resistor hybrid circuit of bridged H-type and comprising at least one current-detecting element, forming a bridge arm of said resistor hybrid circuit, for transmitting said speech current and DC current to said outgoing device.

4. A subscriber's circuit for a four-wire-system local switch having a two-wire/four-wire hybrid circuit comprising:
   (a) a two-wire/four-wire converter for connecting a two-wire system with a four-wire system;
   (b) an incoming circuit device, connected between said converter and a time-division switch section, for amplifying an incoming voice current from said switch section and for supplying a DC current to a subscriber's telephone set through said converter; and
   (c) an outgoing circuit device, connected between said converter and said switch section, for amplifying an outgoing voice current from said subscriber's telephone set,
   said two-wire/four-wire converter being a resistor hybrid circuit of bridged H-type and comprising a pair of current-detecting elements, forming a pair of bridge arms of said resistor hybrid circuit, for transmitting the respective output signals thereof to said outgoing circuit device, said outgoing device including means for summing said respective output signals to thereby suppress longitudinal current.

5. A subscriber's circuit for a four-wire-system local switch having a two-wire/four-wire hybrid circuit comprising:
   (a) a two-wire/four-wire converter for connecting a two-wire system with a four-wire system;
   (b) an incoming circuit device, connected between said converter and a time-division switch section, for amplifying an incoming voice current from said switch section and for supplying a DC current to a subscriber's telephone set through said converter; and
   (c) an outgoing circuit device, connected between said converter and said switch section, for amplifying an outgoing voice current from said subscriber's telephone set,
   said outgoing circuit device comprising means for transmitting a signal representative of a subscriber's call or answer to said switch section in response to a cut-off of the DC current supplied from said converter.

6. A subscriber's circuit for a four-wire-system local switch having a two-wire/four-wire hybrid circuit comprising:
   (a) a two-wire/four-wire converter for connecting a two-wire system with a four-wire system;
   (b) an incoming circuit device, connected between said converter and a time-division switch section, for amplifying an incoming voice current from said switch section and for supplying a DC current to a subscriber's telephone set through said converter; and
   (c) an outgoing circuit device, connected between said converter and said switch section, for amplifying an outgoing voice current from said subscriber's telephone set,
   said outgoing circuit device comprising means for disconnecting said outgoing circuit device from said converter in response to a cut-off of said DC current supplied to said telephone set to thereby prevent singing.

7. A subscriber's circuit for a four-wire-system local switch having a two-wire/four-wire hybrid circuit comprising:
(a) a two-wire/four-wire converter for connecting a two-wire system with a four-wire system;
(b) an incoming circuit device, connected between said converter and a time-division switch section, for amplifying an incoming voice current from said switch section and for supplying a DC current to a subscriber's telephone set through said converter; and
(c) an outgoing circuit device, connected between said converter and said switch section, for amplifying an outgoing voice current from said subscriber's telephone set,
said two-wire/four-wire converter being a resistor hybrid circuit of bridged H-type and comprising a pair of current-detecting elements, forming a pair of bridge arms of said resistor hybrid circuit, for transmitting the respective output signals thereof to said outgoing circuit device, the difference between said respective output signals being taken to thereby detect a line failure such as line inductive-capacitive coupling interference and line grounding.

* * * * *